J. A. BUTLER, C. REYNOLDS & A. J. SEAMAN.
BOX COVERING MACHINE.
APPLICATION FILED MAR. 4, 1907.

1,056,004.

Patented Mar. 18, 1913.

Witnesses.
Raphael G. Blanc.
Blanche L. Gilbride

Inventors.
James A. Butler
Clark Reynolds
Albert J. Seaman
By Henry J. Miller
atty.

J. A. BUTLER, C. REYNOLDS & A. J. SEAMAN.
BOX COVERING MACHINE.
APPLICATION FILED MAR. 4, 1907.

1,056,004.

Patented Mar. 18, 1913.
9 SHEETS—SHEET 6.

Witnesses
Raphael G. Blanc.
Blanche L. Gilbride.

Inventors.
James A. Butler
Clark Reynolds
Albert J. Seaman
By Henry J. Miller
atty.

J. A. BUTLER, C. REYNOLDS & A. J. SEAMAN.
BOX COVERING MACHINE.
APPLICATION FILED MAR. 4, 1907.

1,056,004.

Patented Mar. 18, 1913.

Witnesses.
Raphael G. Blanc.
Blanche L. Gilbrid.

Inventors.
James A. Butler
Clark Reynolds
Albert J. Seaman
By Henry J. Miller atty.

J. A. BUTLER, C. REYNOLDS & A. J. SEAMAN.
BOX COVERING MACHINE.
APPLICATION FILED MAR. 4, 1907.

1,056,004.

Patented Mar. 18, 1913.

J. A. BUTLER, C. REYNOLDS & A. J. SEAMAN.
BOX COVERING MACHINE.
APPLICATION FILED MAR. 4, 1907.

1,056,004.

Patented Mar. 18, 1913.

Witnesses.
Raphael G. Blanc.
Blanche L. Gilbride.

Inventors.
James A. Butler
Clark Reynolds
Albert J. Seaman
by Henry J. Miller
atty

UNITED STATES PATENT OFFICE.

JAMES A. BUTLER, OF WINTHROP, AND CLARK REYNOLDS AND ALBERT J. SEAMAN, OF BOSTON, MASSACHUSETTS, ASSIGNORS OF THREE-FOURTHS TO THEMSELVES, AND ONE-FOURTH TO CLARENCE W. BARRON, OF BOSTON, MASSACHUSETTS.

BOX-COVERING MACHINE.

1,056,004.     Specification of Letters Patent.    Patented Mar. 18, 1913.

Application filed March 4, 1907. Serial No. 360,596.

*To all whom it may concern:*

Be it known that we, JAMES A. BUTLER, of Winthrop, and CLARK REYNOLDS and ALBERT J. SEAMAN, of Boston, all in the county of Suffolk and State of Massachusetts, have invented certain new and useful Improvements in Box-Covering Machines; and we hereby declare that the following is a full, clear, and exact description of the same, reference being had to the accompanying drawings, forming part of this specification.

This invention has reference to improvements in box covering machines, and particularly to such machines in which the box to be covered is carried by reciprocating devices between mechanisms which apply the covering blank to said box.

One object of the invention is to so construct a machine of this character, that the covering blank may be smoothly applied to the bottom of the box and pressed there against.

Another object of the invention is to so construct a box covering machine that the cover blank may be fitted closely over the corners and the edges of the box.

Another object of the invention is to so construct a box covering machine that the side and end edges of the cover blank may be turned over the corresponding edges of the box in succession.

Another object of the invention is to so construct a box covering machine that pressure may be applied to the turned in edges equally from within and from without the box.

Another object of the invention is to so construct a box covering machine, that retractive action of any of the cover turning devices may be avoided.

Another object of the invention is to improve the plunger actuating mechanism.

Other objects of the invention are to improve the driving mechanism and the means for controlling the same.

The invention consists in an organized mechanism for movably supporting a box and a cover blank designed to be attached thereto, for turning the side flaps of said blank against the sides of the box, for turning the ends of said side flaps over the ends of the box, for then turning the edges of said side flaps over the edges of the box sides, and pressing said edges firmly against the box, for subsequently turning the end flaps of said blank against the ends of the box, for then turning the edges of said end flaps over the corresponding edges of the box, and pressing said edges against the box ends and, finally, for removing the finished box from the machine before the parts of the machine return to position to receive another box and its cover blank.

The invention also consists in such other novel features of construction and combination of parts as shall hereinafter be more fully described and pointed out in the claims.

Fig. 6½, represents an enlarged view showing details of the latch for the holding of the wiper moving rod. Figs. 12 to 26 inclusive are diagrammatic views illustrating the progressive steps in covering a box by the use of this machine.

Similar numbers of reference designate corresponding parts throughout.

Figure 3:
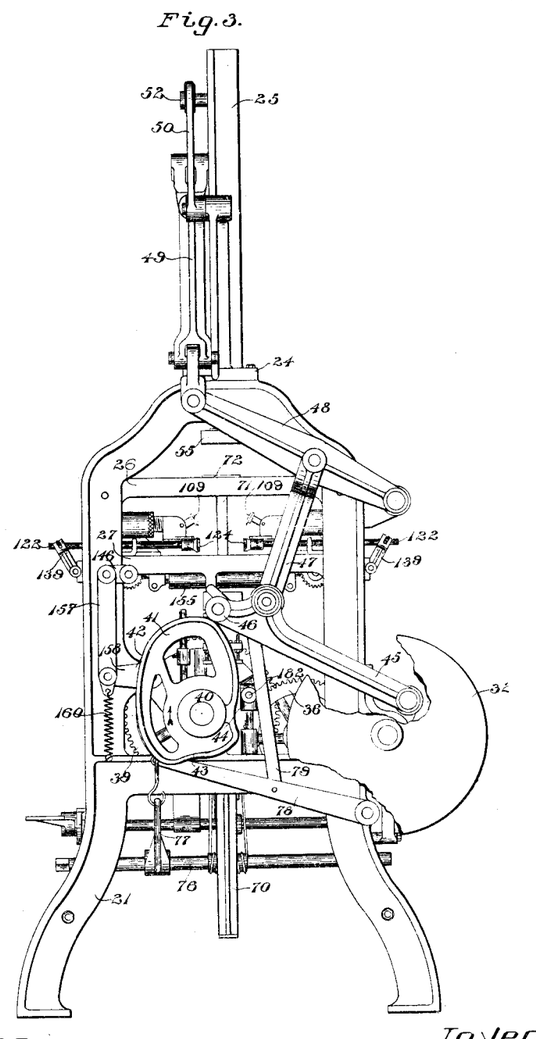
Fig. 3, represents a similar view looking toward the left in Fig. 1.
Figure 4:
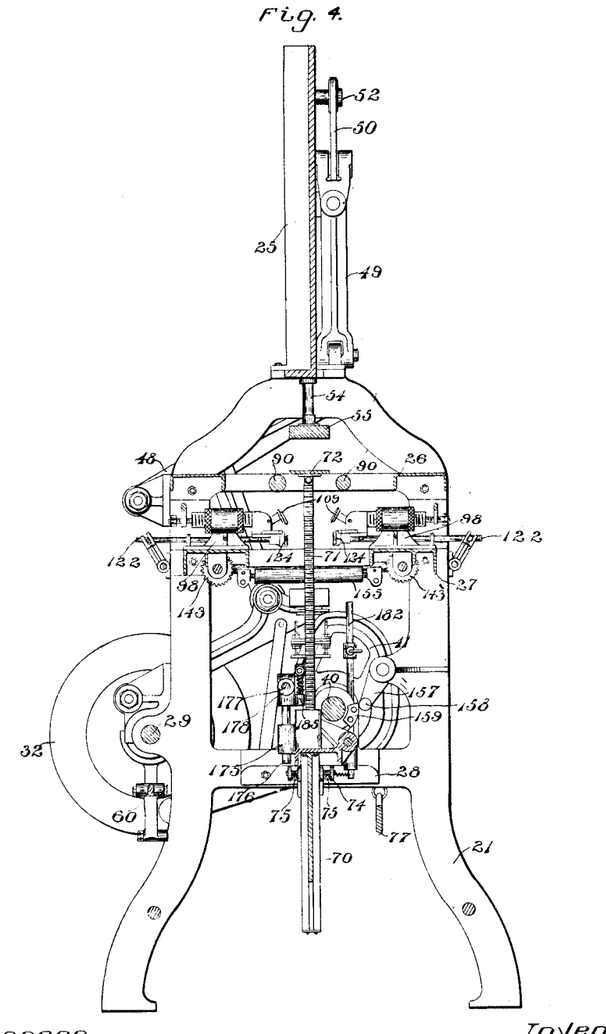
Fig. 4, represents a vertical sectional view taken on line 4—4 Fig. 1, looking toward the right.
Figure 5:
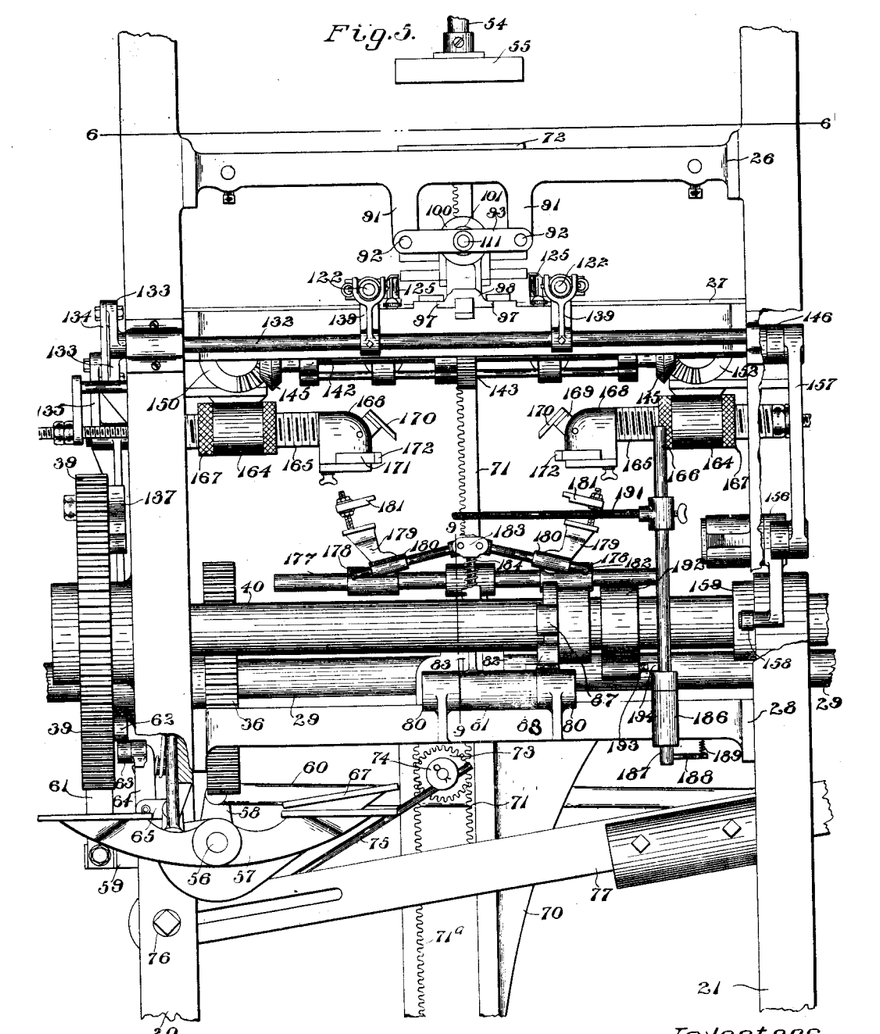
Fig. 5, represents an enlarged front view of portions of the machine.

As shown in the drawings, in its preferred form the machine is furnished with the side frames 20—21 connected together by the upper plate 24 having the vertical ways 25, and the plates 26, 27 and 28. In bearings extending rearwardly from the frames 20—21 is journaled the drive shaft 29 having the slidably mounted clutch member 30 and the independently rotatable clutch member 31, furnished with the drive pulley 32, which is adapted to be continuously driven in any well known manner. On said shaft 29 is also mounted the brake member 33, the hand wheel 34, and the pinion 35 which meshes with the gear 36 of the shaft 37 journaled in bearings of the frame members 22—23 and having the pinion 38 which meshes with the gear 39 of the cam shaft 40, which, at its end outside the frame 21, has the plunger operating cam 41, which has the depressions 42, 43 and 44 and intermediate dwells as shown in Fig. 3.

Pivotally mounted at the rear of the frame 21, is the cam lever 45, which extends forward and has the bearing 46 which rides on the cam 41. At the upper rear portion of the frame 21 is pivoted the lever 48 which is pivotally connected by the link 47 with the lever 45 and by the pivoted link 49, with the lever 50, pivotally mounted at one end on a lateral extension of the plate 24 and at the other end having the slot 51, which engages the pin 52 of the cross head, slidable in the ways 25 and having the plunger rod 54 furnished with the plunger head 55 of a cross sectional size and shape to fit the interior of the box to be covered, but considerably less in height than the height of the box.

Journaled in bearings of the frame 20 is the brake operating shaft 56 having at its forward end the foot lever 57, and at the rear end the levers 58 and 59, the former of which is pivotally connected by the rod 60 with the slidable clutch member 30 while the latter is connected with the friction strap 61 which is fixed at its other end to the frame 20 and bears against the periphery of the main brake member 33. The shaft 56 may be rocked in its bearings by means of the lever 57 to set or release the brake strap 61 but, in order to bring the mechanism to a stop after a cycle of operation has been completed, the brake is designed to be automatically operated at each complete rotation of the shaft 40, through the instrumentality of the cam 62, adjustably mounted at the inner side of gear 39, and working against the free end of the arm 63, which is pivotally mounted on the member 23 of the frame 20 and, when pressed downward by said cam 62 actuates the pivoted spring pressed finger 64 of the arm 65, fixed on the shaft 56, to rock this brake shaft and set the brake, at the same time moving the slidable clutch member 30 out of engagement with the driven clutch member 31.

In order to provide for the continuous running of the machine at times a tripper device is provided which comprises the shaft 66 journaled in bearings alongside the shaft 56 and having the lever 67 and the arm 68 which is pivotally connected by a link with the pivoted finger 64 whereby, when the shaft 66 is rocked, by pressure on the lever 67, the finger 64 may be swung out of the path of the arm 63 and no action of the brake shaft 56 results from the operation of said arm.

Depending from the cross plate 28, is the member 70, having vertical ways in which works the rack 71 furnished at its upper end with the presser plate 72 of a cross sectional size and shape corresponding to that of the box to be operated upon. From said plate 28 also depends the fixed rack 71ª which is parallel to the ways of the member 70 and between said member and said rack 71ª is movable the pinion 73 which is designed to mesh with the racks 71 and 71ª and is provided with a shaft having the disks 74—74 and engaged by the spring arms 75—75 which are secured on the rock shaft 76, journaled in the frame 20, and having the lever 77 which extends across the machine and is connected to the lever 78, pivoted at the rear of the machine, and connected by the link 79 with the cam lever 45, whereby the rocking of the shaft 76 may be effected to increase or diminish the action of the springs 75—75 on the shaft of the pinion 73.

On the plate 28 are mounted the bearings 80—80 between which is journaled the sleeve 81, having the projection 82 and the arm 83 furnished at its free end with the cam brake 84 adapted at times to bear against the side of the rack 71. On the shaft 40 is secured the collar 85 having the cams 86, 87 and 88, which are designed to successively engage the projection 82 on the shaft 81 to effect the swinging of the cam brake 84 against the rack 71. The spacing of said cams 86, 87 and 88 is so related to the location of the dwells between the acting parts of the main cam 41, that, when the plunger rod 54, is brought to a rest at periods in its downward movement, owing to the dwells on said main cam, the brake 84 will be actuated to simultaneously stop the downward movement of the rack 71.

Figure 7:
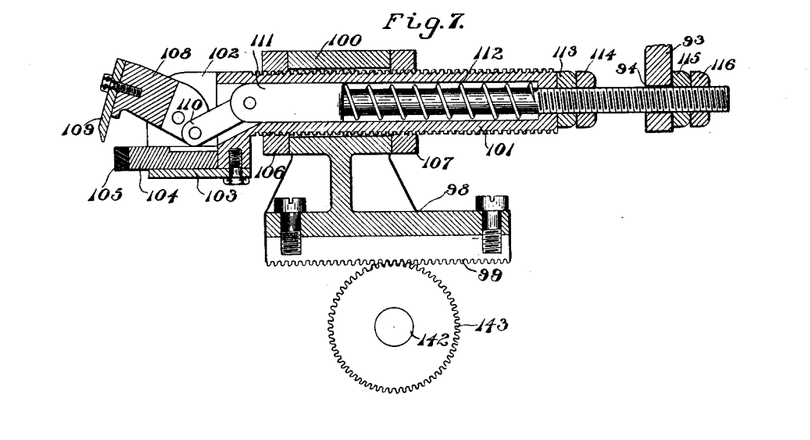
Fig. 7, represents a sectional detail view of one of the edge turners taken on line 7—7 Fig. 6.
Figure 8:
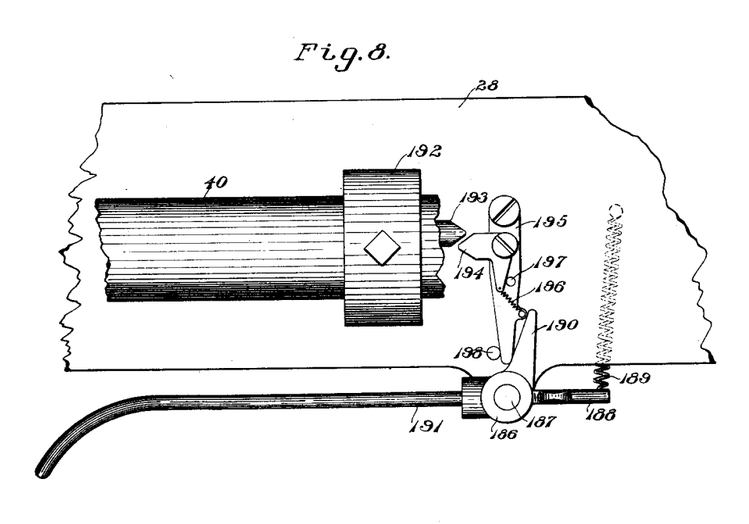
Fig. 8, represents details in plan view of the ejector mechanism.
Figure 9:
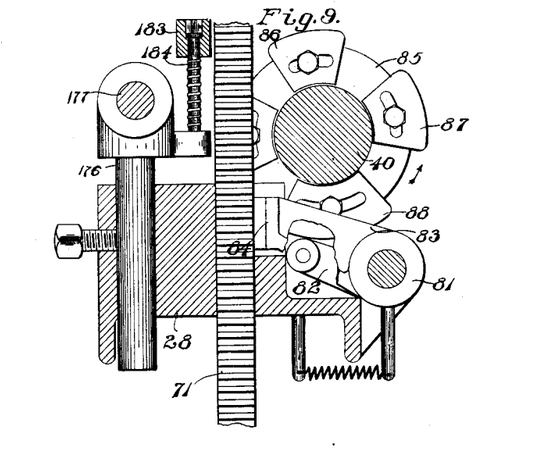
Fig. 9, represents a vertical section taken on line 9—9 Fig. 5, looking toward the left, to more clearly illustrate the brake or lock for the platen rack.
Figure 10:
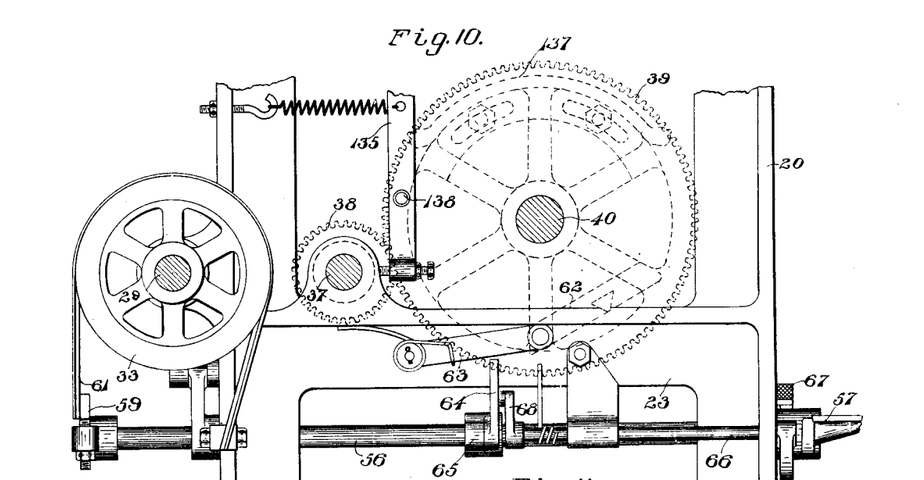
Fig. 10, represents an enlarged view taken from the same point as Fig. 2, with some of the parts removed to more clearly illustrate the brake and tripper mechanism.
Figure 11:
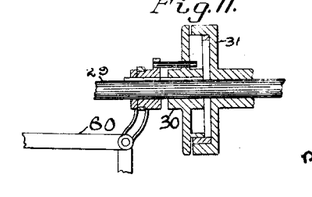
Fig. 11, represents a sectional view of the clutch connection for the drum shaft.

The plate 26 is open at its center and is furnished with the side covering rolls 90—90 formed of yielding material, or designed to effect a yielding pressure against the sides of a box of suitable size passed therebetween. Depending from the front and rear portions of this plate 26, are arms 91—91 carrying the pairs of rods 92—92 on which are mounted cross plates 93—93, each of which has a guide opening 94, as shown in Fig. 7 of the drawings.

Plate 27 is open at its center and has the guides 97—97 for the side edge turning devices indicated generically by the reference numb vices comprise carriages having racks 99—99 slidably mounted. At the upper portions such carriages have sleeves 100—100 adapted to receive the chambered members 101—101 exteriorly screw threaded, and furnished at their inner ends with the side plates 102—102, and the bottom plate 103, the latter of which is designed to support the presser block 104 preferably having the edge cushion 105. The members 101 are adjustable in the bores of the sleeves 100 and are secured therein by means of the nuts 106—107. Between the plates 102—102 is pivotally mounted the jaw 108 having the plate 109 and connected by the pivoted link 110 with the end of the slide rod 111, which has a reduced portion which is free to slide in a perforation at the end of the member 101, and carries the spring 112 located between the shoulder of this slide rod and the end of the chamber in said member 101, whereby the tendency of said spring is to move the slide rod forward to swing the jaw 108 to the open position as shown in Fig. 7 of the drawing; on the screw threaded portion of the slide rod 111 are mounted the nuts 113—114 and 115—116, the first pair of which act as a stop against the action of the spring 112 while nut 115 acts as a stop to limit the forward movement of the slide rod through the opening 94 of the cross plate 93, while the member 101 and its fixed jaw is carried sufficiently beyond such limit of movement as will effect the swinging of the jaw 108, by the resistance of the slide rod, and the closing of the plate 109 toward the edge 105 sufficiently to exert the desired pressure.

The upper portion of the plate 27 is furnished with guides 117—117 on which the carriages 118—118 of the end turn in devices are slidable, said carriages being supplied with clamping screws 119—119 by means of which the carriages may be screwed to said guides after suitable adjustment. These carriages 118—118 have, at their upper portions, guide sleeves 120—121 for the slidable rods 122—122 having at their inner, or forward ends, the pivoted levers 123—123 furnished with the arms 124—124 on which are mounted the wipers 125—125 of any suitable construction. The arms 124—124 are connected with fixed portions of the rods 122—122 by retraction springs 126—126, whereby said arms 124—124 and their wipers 125—125 are drawn inward. Pivotally connected with the levers 123—123 are slide rods 127—127, slidably mounted in guides extending from the sleeves 121—121 and furnished with the adjustable stops 128—128. The sleeves 120—120 have fingers 129—129 having beveled ends, and the rods 122—122 are furnished, between the sleeves 120—121 with collars 130—130, which are adapted to be secured in position on said rods, and spring pressed latches having pins 131—131 which are adapted to be engaged by the beveled ends of the fingers 129—129, when the rods 122—122 are moved outward to retract said latches from engagement with the stops 128—128 on the backward movement of the rods 122.

Journaled in bearings of the end frames 20—21 are the rock shafts 132—132, having crank arms 133—133, which are connected by the rod 134 which is actuated by the lever 135 pivoted on the extension 136 from the frame 20, and operated by the cam 137 on the gear 39, contacting with the lower end of said lever 135 to swing said lever, and, through the medium of the rod 134, to rock the shafts 132—132 and to effect the sliding of the rods 122—122 by means of the arms 139—139 mounted on said shafts 132—132 and pivotally connected with said rods 122—122.

Figure 6:
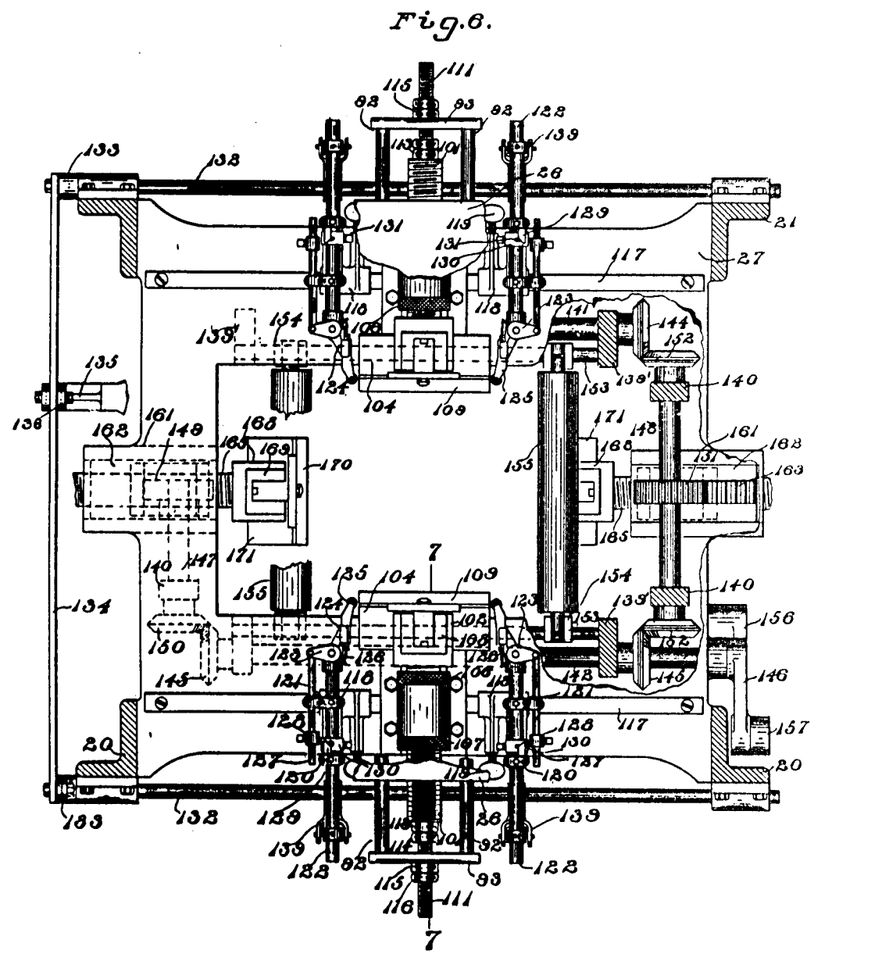
Fig. 6, represents an enlarged sectional view of the machine taken on line 6—6 Fig. 5 parts of same being broken away.
Figure 6A:
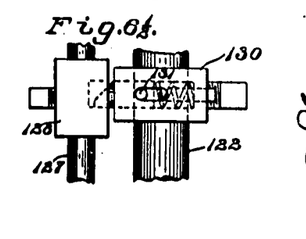

By reference to Fig. 6 of the drawing it will be seen that as the rods 122—122 are moved inward the wipers 125—125 will move in a straight path, during which movement the work of these devices in turning the end of the side flaps of the carton blank over the ends of the box under operation is preferably accomplished; when however, the stops 128—128 of the rods 127—127 reach the guides in which said rods are slidable, the continued movement of the rods 122—122 results in the swinging outward of the arms 124—124 and the wipers 125—125 away from the ends of the box, in which position the wipers are held against the action of the springs 126 by the engagement of latches 131—131 with the stops 128, as is shown in Fig. 6½. When the rods 122—122 are retracted, the pins 131 of the latches ride against the beveled ends of the fingers 129—129 and slide inward, thus disengaging the latches from the stops 128—128, and permitting the rods 127—127 to slide inward, and the arms 124—124 to swing to place under the action of the springs 126—126. Depending from the plate 27, are the bearing brackets 139'—139' and 140—140. In the brackets 139'—139' are journaled the shafts 141—142, each having a pinion 143 which meshes with the rack 99 of its associated edge turning carriage 98. On one end of the shaft 141 is the bevel gear 144, while the shaft 142 has the bevel gears 145—145, and is furnished with the crank arm 146.

Journaled in the brackets 140—140 are the shafts 147—148, the former of which has the pinion 149 and the bevel gear 150, which meshes with the gear 145 of the shaft 142, while the shaft 148 has the pinion 151 and the bevel gears 152—152 which are engaged with the gears 144 and 145 respectively of the shafts 141 and 142.

Between the pairs of brackets 139'—139' extend rods 153—153, on which bearings 154—154 are adjustably mounted and in these bearings are journaled the end flap turning rolls 155—155, adapted to be so spaced, that the box under operation may pass between these rolls which, acting against the end flaps of the cover blank extending outward beyond the ends of the box, turn said flaps and press them against the ends of the box as the box moves downward.

Crank arm 146 is swung to rock the shaft 142 in one direction by the bell crank lever 156, pivotally mounted on the frame 21 and having the link 157, pivoted thereto and to the arm 146, and the roll 158 extending into the path of the cam 159 on the shaft 40. Retraction of the arm 146 to rotate the shaft 142 and the parts connected therewith is effected by means of the spring 160 secured to one arm of the bell crank lever 156 and to some fixed part of the frame 21, whereby the roll 158 is held constantly against said cam 159.

Figure 1:
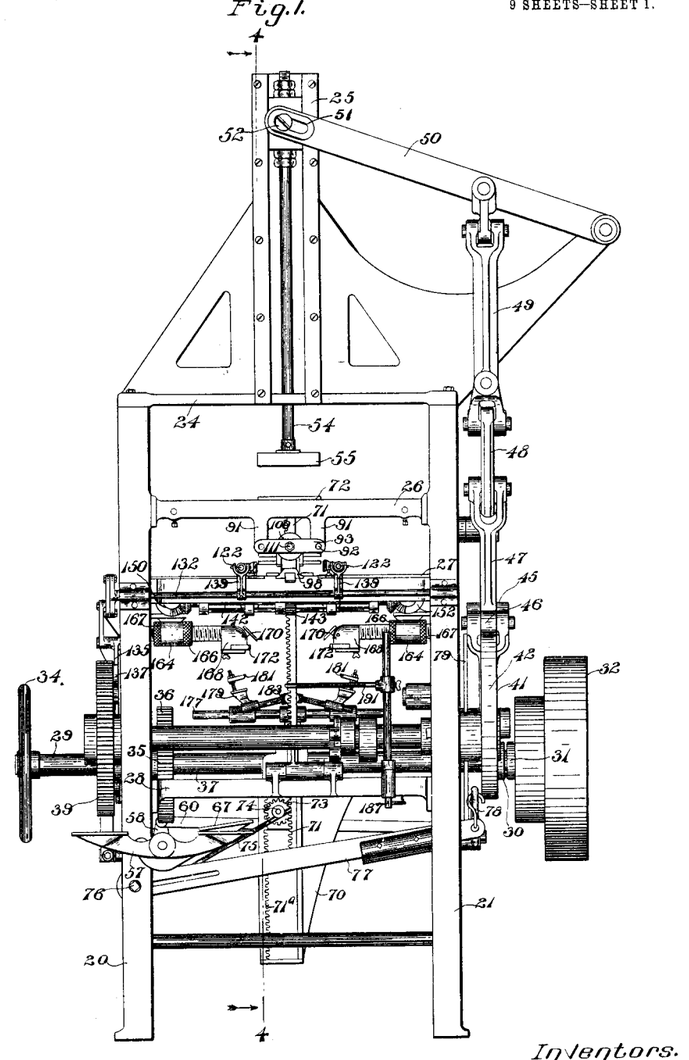
Figure 1, represents a front view of the improved box covering machine.
Figure 2:
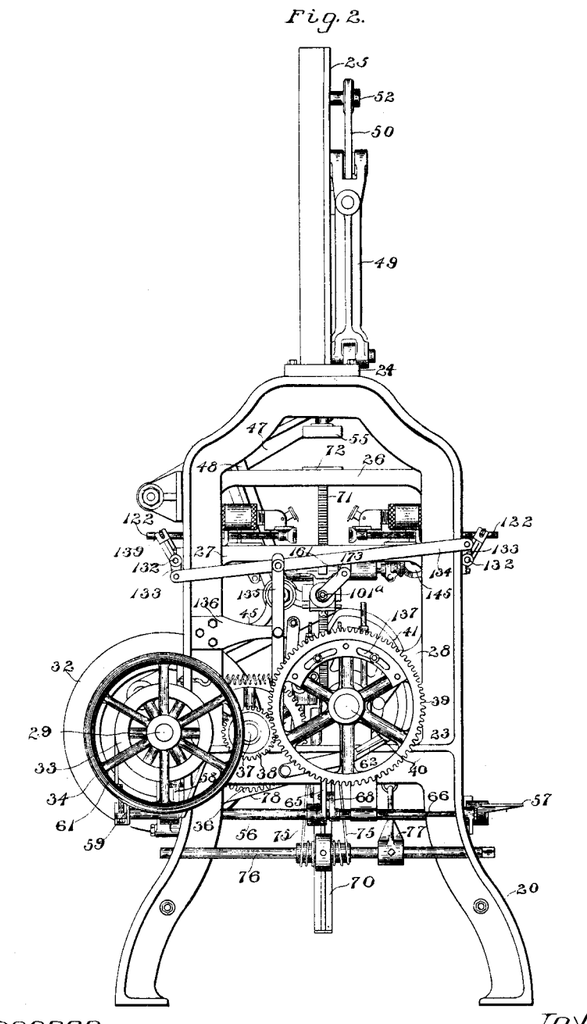
Fig. 2, represents a side elevation of the same looking toward the right in Fig. 1.

Depending from the plate 27 at the side portions, having the brackets 140—140 are the slides 161—161 in which are slidable the carriages 162—162 of the end edge turn in devices, which carriages have the racks 163—163, engaged by the pinions 149 and 151 of the shafts 147—148, and have also the sleeves 164—164 in which are mounted the screw threaded chambered members 165—165 similar to those marked 101 and furnished with the adjusting and securing nuts 166—167. These members 165—165 have side plates 168 carrying pivoted blocks 169, furnished with plates 170, and presser blocks 171 preferably having cushion edges 172. Interiorly of these members 165—165 are mounted spring pressed slide rods as 111 pivotally connected by links as 110 with the blocks 169—169, and said slide rods have screw threaded portions which are free to slide in perforations in the end walls of the members 101, and which threaded portions are furnished with stop and lock nuts as 113—114 and 115—116, which limit the movement of the slide rods in perforations of plates as 173 mounted on parts of the slides 161. We have applied the reference number 101ᵃ to the slide rods of the members 165—165 when said rods appear in the drawings as shown in Fig. 2.

The cross plate 28 is furnished with the socket 175 in which is supported the rod 176 having the cross member 177, on which are slidably mounted the sleeves 178—178, carrying the pivoted blocks 179—179 having the guides 180—180 and the adjustable stripper plates 181—181. In the guides 180—180 are slidably engaged the rods 182—182, which are pivoted to the actuator rod 183 vertically movable in a guide of said cross member 177 and furnished with the spring 184 located between a shoulder on the rod 183 and the end of its guide where said spring tends constantly to move said actuator rod 183 upward, to effect the swinging outward of the blocks 179—179 and their stripper plates 181—181. At one edge portion of said plate 28 is the vertical bearing 186, in which is journaled the rod 187 having the arm 188 connected by the spring 189 with the plate 28, and the pin 190, and on this rod 187 is adjustably mounted the ejector arm 91. On the shaft 40 is the collar 192 having the cam 193 which is designed to engage the pawl 194 pivotally mounted on the arm 195 and having the retracting spring 196, which tends to draw one arm of said pawl toward the pin 197 on said arm 195 which arm is pivotally mounted on the frame members 28 and acts against the pin 190 of the rod 187 to swing said rod against the action of the spring 189 and to limit the return movement of said rod, when retracted by said spring, by contact with the stop pin 198 on said frame member 28.

The cover blank A preferably used on this machine has side flaps B having the edge portions C and ends D, and end flaps F having edges G. It is of course obvious that, the shape of the cover blank depends largely upon the shape of the box to be covered thereby, and, in some cases, on the manner in which the box is to be covered, as when loose wrappers, so called, are used.

Figures 12, 14, 16:
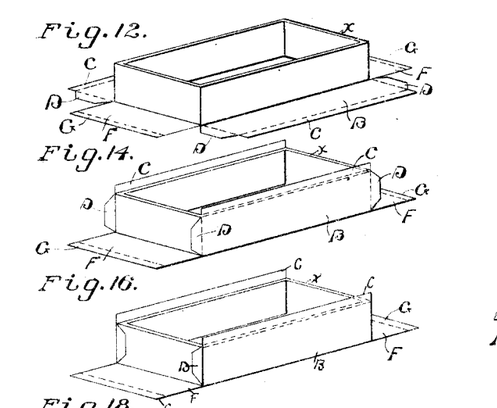
Figure 13:
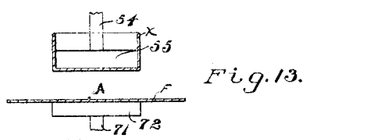
Figure 15:
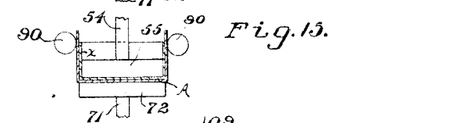
Figures 17, 19:
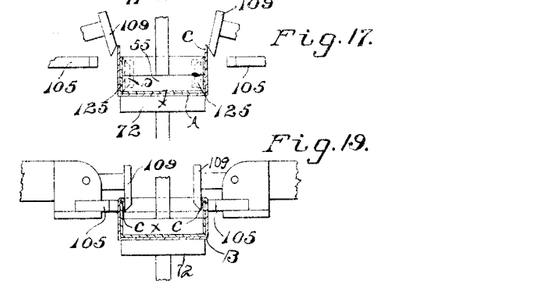
Figure 18:
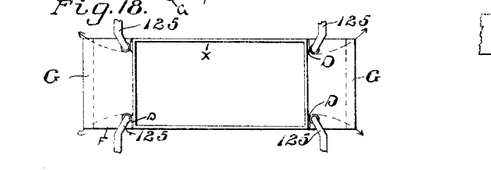
Figure 20:
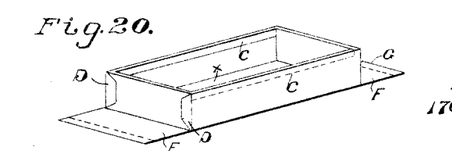
Figure 21:
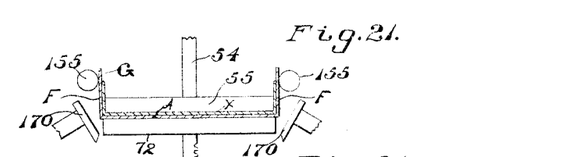
Figures 22, 24:
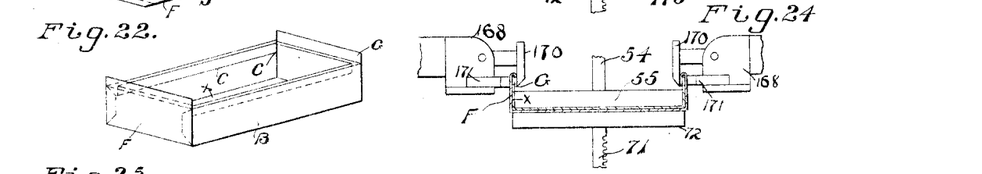
Figures 25, 26:
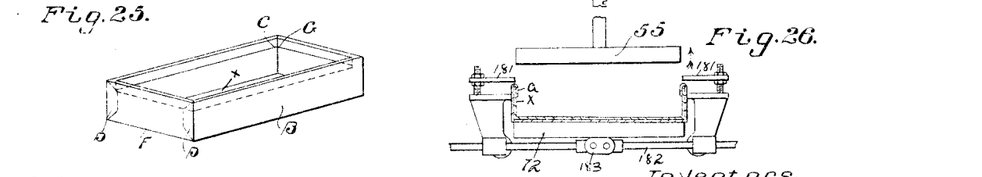

Operation of the machine: A cover blank A, having a coating of adhesive on its upper surface, is placed on the platen 72 and centered with respect to the plunger head 55, and the box $x$ to be covered placed on the plunger head 55. The machine operator places his foot on the tripper lever 67 and presses the same down, thus effecting the swinging of the pivoted finger 64 out of the path of the arm 63 and, as such pressure is continued, ultimately pressing down the ends of the lever 57 to rock the shaft 56 and arm 58 thereon to shift the rod 60 and the clutch member connected therewith into contact with the complemental clutch member carried by the driven pulley 32; at the same time such movement of the lever 57 effects the loosening of the brake strap 61. As the shaft 29 is driven by such connection, motion is transmitted from said shaft through the pinion 35, gear 36 and pinion 38 to the gear 39 on the shaft 40 to rotate that shaft and the main cam 41 thereon. The rotation of the cam 41 first brings the depression 42 beneath the roll bearing 46 which follows such depression, and actuates levers 47, 48, 49 and 50 to operate the cross head 53 carrying the rod 54 with its plunger head 55 and the box carried thereby. This operation moves the box downward onto the center, or body, of the cover blank, and the pressure of the plunger head 55 being resisted by the yieldingly supported platen 72, effects the pressing of such body portion of the blank smoothly against the bottom of the box, the application of pressure over the whole area of the body of the blank at the time at which the adhesive surface of the blank is applied to the box, and the continuance of such pressure, prevents the creeping or wrinkling of the cover blank as would be the case if the cover blank was applied to the bottom of the box while the plunger was at a distance from the platen 72. Under the action of the roll 46 following depression 42 of the cam 41, the plunger head forces the yieldingly supported platen 72, with the box and its cover blank downward between the side turn up rolls 90—90, which turn the sides B—B of the blank against the sides of the box as is shown in Fig. 12 until the position illustrated in Figs. 14 and 15 is reached, when the box rests between the edge turn in devices or plates 109—109 and the ends D—D are in the paths of the end turn in wipers 125—125. As this position is reached, the cam 86 on the shaft 40, bears against the projection 82 of the shaft 81 to effect the swinging of the cam brake 84 into frictional engagement with the side of the rack 71, whereby said rack is brought to a stop. While the dwell of the cam 41 between the depressions 42 and 43 is passing beneath the roll 46, the side edge turn in devices are advanced by the rotation of the pinion 143 in engagement with the racks 99 of such devices, until the cushions 105—105 bear against the outer surface of the wrapper sides B—B near the top edges of the box, and the plates 109—109 of such devices have turned the edges C—C over the edges of the box sides as shown in Fig. 19. Practically simultaneously therewith, the end wipers 125—125 have been advanced, as heretofore described, to the position shown in Fig. 18, turning in the ends D—D of the side flaps B—B and then swinging outward as indicated in dotted lines in said figure, in order to prevent any drag on said ends D—D, in any direction, whereby distortion of these ends is prevented. Approximately as the turning of the ends D—D is completed, the forward movement of the side edge turners, brings the nuts 115 against the plates 93 and the further forward movement of the slide rods is prevented while the bases 98 continue their movement, whereby the links 110 draw on the pivoted blocks 108 which are swung downward, and the plates 109 turn downward the edges C—C of the sides, and press them against the inner surfaces of the box sides. the outward pressure of said plates 109 being resisted by the cushions 105—105. The plates 109 are then released by the backward movement of the bases 98 and the action of the springs 112. Cam 86 now passes the projection 82 of the shaft 81 and the rack 71 is released from the cam brake 84 while the depression 43 of cam 41 is brought under the roll 46, and effects the further movement of the plunger rod 54 and head 55 is effected to force the box and the platen 72 down between the end turn in rolls 155—155, where the ends F—F of the blank are turned against the ends of the box. At this time cam 87 of the shaft 40 acts against the projection 82, and the cam brake 84 is swung into frictional contact with the side of the rack 71, to again lock this rack and its plate 72 against downward movement. The end edge turn devices are now advanced by swinging of the lever 135 under the retraction strain of its spring, and the operation of turning said end edges G—G over the end edges of the box, is accomplished by the plates 170, in a manner similar to that above described for turning in the edges of the flaps B—B after which the cam 87 passes the projection 82 and the rack 71 is again released. Projection 44 of cam 41 now passes under roll 46, and the plunger rod and head are forced downward to carry the platen and finished box to their lowest point of movement, where the rack 71 is again locked by reason of cam 88 on shaft 40, working over the projection 82 of the cam brake 84.

In its final downward movement, the platen 72 strikes the slide rod 183 of the stripper mechanism, and moves the same down against the action of its spring 184, and thus effects the swinging inward of the blocks 179—179 and their stripper plates 181—181 to bring the edges of said plates over the edges of the box. At this time the largest diameter of the cam 41 rides under the roll 46, and lifts said roll and its related mechanism to move the plunger rod and its head upward, the plates 181—181 effecting the stripping of the box from the plunger head while said head moves upward. Shaft 40 has now rotated sufficiently to bring the cam 193 into engagement with the pawl 194 and the continued rotation of such shaft and its cam 193 effects the swinging of the arm 195, through the medium of said pawl, and the rotation of the rod 187, by the action of the arm 195 on the pin 196, whereby the ejector arm 191 is swung to knock the finished box laterally from the platen 172. As the cam 193 moves by the pawl 194 the spring 189 is free to retract the arm 188 to rotate the rod 187 to the normal position and, as the arm 195 swings back to position, the pawl 194 is free to swing past the cam 193. This ejection occurs just prior to the release of the projection 82 of the cam brake by the cam 88 of the shaft 40, and hence, when such release occurs, the lifting strain of the spring arms 75—75 on the pinion 73, increased by the lifting of the free end of the compensation lever 77, is sufficient to force said pinion upward, but as said pinion is engaged at one side, by the teeth of the fixed rack 71ª and at the other by the teeth of the movable rack 71, said pinion rotates, and the movable rack 71 and its platen, is driven upward thereby to its original position. Cam 63 of gear 39 now bears on the pivoted arm 63, and moves the same downward, to actuate the finger 64 to rock the shaft 56, whereby the sliding clutch member is moved away from the driven clutch member of pulley 32 and the brake strap 61 is applied to its brake member 33 to bring the shaft 29 and the mechanism connected therewith to a stop. If it is desired to run the machine continuously, the levers 57 and 67 are held downward. It is to be noted that by turning in the edges of the side flaps, and of the end flaps of the cover blank in succession, said edges may be pressed against the inner surfaces of the box sides and ends respectively for their entire lengths thus producing a better finish at the inside of the corners. The cushions 105—105 of the side edge turners, and those 172—172 of the end edge turners, are in the nature of resistance devices, to resist the outward pressure of the turning plates 109 and 170, for the upper edge portion of the box extends above the plunger head 55, in order to permit the entrance of said plates 109 and 170 to press the edges of the blank against the inner edge portions of the box. When a loose wrapper is to be applied by this machine, the edges C—C and G—G, of the blank A, only, are furnished with adhesive, and a modified but well known form of the blank is generally used. In this process, the loose side flaps are held in position, to which they are turned by the rolls 90—90, by the edges of the plates 109—109 and the end flaps, after passing between the rolls 155—155, are similarly supported by the plates 170—170. The movement of the box after the turning in of the end portions of the side flaps being sufficiently rapid, that unfolding of said ends does not occur before the end flaps are turned up by rolls 155—155.

Having thus described our invention we claim as new and desire to secure by Letters Patent.

1. A box covering machine comprising in organization, side flap turning means, side edge turning in and pressing means, side end turning means, end turning means, end edge turning and pressing means, stripper means, intermittently actuated mechanism for carrying a box and its cover blank between said respective turning in and pressing means in succession, and bringing said box when finished in position to be engaged by the stripper means, and means operated by the movement of the box carrying means for bringing the stripper mechanism to the engaging position, substantially as described.

2. A box covering machine comprising a plunger slidably mounted, means for operating the plunger, a platen in the path of the plunger and having a rack mounted in guides, and rotatable spring actuated rack engaging means.

3. A box covering machine comprising a plunger, a platen in the path of the plunger and having a rack slidably mounted, a fixed rack parallel to the platen rack, a pinion engaging said rack, and spring means adapted to exert an upward pressure on said pinion.

4. A box covering machine comprising a plunger movably mounted, means for moving the plunger vertically, a platen movably mounted in the path of the plunger, spring actuated means for exerting a pressure to move the platen upward and including a compensating lever and means for actuating said lever in unison with the plunger moving means.

5. A box covering machine comprising a plunger movably mounted, means for moving the plunger vertically, a platen in the path of the plunger and having a support slidably mounted, spring actuated means for exerting a lifting pressure on said platen support and including a rock shaft, and a lever extending from said rock shaft and connected with the plunger moving means.

6. A box covering machine comprising a plunger movably mounted, means for moving the plunger vertically, a platen in the path of the plunger and having a rack slidably mounted, a fixed rack parallel to the platen rack, a pinion engaging said racks and having a shaft, a rock shaft provided with spring arms engaging the shaft of said pinion, a lever fixed on said rock shaft, and means for moving the free end of said lever in unison with the plunger and in the same general direction.

7. A box covering machine comprising a plunger movably mounted, means for moving the plunger vertically, a platen in the path of the plunger and having a rack slidably mounted, rotary spring actuated mechanism acting on said rack to resist the downward movement of the platen and mechanism for exerting a varying pressure on said spring actuating means with relation to the movement of the plunger, as and for the purpose described.

8. In a box covering machine, the combination with a carriage movably mounted, means for moving the carriage, a chambered shank adjustably mounted in said carriage and having a head, a block pivotally mounted in the head and having an edge turning and pressing plate, a spring actuated slide bar movable in the chamber of said shank, a toggle link connected with said slide bar, and with said pivoted head, and means for limiting the movement of the slide bar when the carriage moves forward.

9. In a box covering machine, the combination with means for supporting a box and a cover blank with ends of the cover blank extending beyond the ends of the box, of end turning means comprising a carrier slidably mounted, means for moving said carrier, a wiper pivotally mounted on the carrier and means acting to swing the wiper away from the end of the box after the end of the blank has been turned.

10. In a box covering machine, the combination with a plunger, and means for intermittently operating said plunger, of an end turning mechanism comprising slidably mounted carriers, wipers pivotally mounted on said carriers, and yieldingly held in paths parallel with the ends of the plunger, means for moving forward said carriers while the plunger is at rest, and means for moving said wipers away from the ends of the box before the next movement of the plunger.

11. In a box covering machine the combination with a slidably mounted carrier, means for moving said carrier, a spring actuated end flap wiper arm pivotally mounted on the carrier, a slide rod pivoted to said wiper arm, means for limiting the movement of said slide rod, and a latch movable with the carrier and adapted to engage a member on said slide rod.

12. In a box covering machine means for turning the end of a cover blank over the end of a box comprising a carrier slidably mounted, means for moving said carrier, a wiper arm pivotally mounted on the carrier and spring actuated in one direction, a slide rod pivotally connected with said wiper arm and slidable in guides, a stop on said slide rod adapted to contact with a fixed portion of the machine to limit the movement of the slide, a spring latch mounted on the carrier and adapted to engage said stop to hold said slide rod in position relative to said carrier, and means for releasing said latch at the final portion of the return movement of said carrier, as and for the purpose described.

In testimony whereof we affix our signatures in presence of two witnesses.

JAMES A. BUTLER.
CLARK REYNOLDS.
ALBERT J. SEAMAN.

Witnesses:
GEORGE E. DREW,
H. J. MILLER.

Copies of this patent may be obtained for five cents each, by addressing the "Commissioner of Patents, Washington, D. C."